United States Patent
Home

(10) Patent No.: US 12,036,935 B1
(45) Date of Patent: Jul. 16, 2024

(54) DRIVER ISOLATION APPARATUS

(71) Applicant: Ivan Home, Evanston, IL (US)

(72) Inventor: Ivan Home, Evanston, IL (US)

( * ) Notice: Subject to any disclaimer, the term of this patent is extended or adjusted under 35 U.S.C. 154(b) by 442 days.

(21) Appl. No.: 17/504,620

(22) Filed: Oct. 19, 2021

(51) Int. Cl.
*B60R 21/02* (2006.01)
*B60R 21/12* (2006.01)

(52) U.S. Cl.
CPC ............ *B60R 21/026* (2013.01); *B60R 21/12* (2013.01)

(58) Field of Classification Search
CPC ........ B60R 21/06; B60R 21/12; B60R 21/026
USPC ................................ 296/24.42, 24.43, 24.46
See application file for complete search history.

(56) References Cited

U.S. PATENT DOCUMENTS

| | | | |
|---|---|---|---|
| 3,509,810 A | 5/1970 | Riester | |
| 3,549,195 A * | 12/1970 | Kallinikos | B60R 21/12 180/289 |
| 3,632,154 A | 1/1972 | Woodrich | |
| 4,869,446 A | 9/1989 | Hubert | |
| 6,502,859 B1 * | 1/2003 | Svetlik | B60R 21/06 280/748 |
| 6,669,259 B2 * | 12/2003 | Murray | B60R 21/026 296/24.46 |
| 7,323,025 B2 | 1/2008 | Weidner | |
| 8,007,351 B1 | 8/2011 | Maloney | |
| 8,833,831 B2 * | 9/2014 | Manzke, Jr. | B60R 21/026 296/178 |
| 9,956,898 B1 * | 5/2018 | Dellock | B60Q 3/68 |
| 10,752,196 B2 * | 8/2020 | Lalague | B60R 21/026 |
| 10,800,305 B2 * | 10/2020 | Garcia Sanchez | B60R 21/026 |
| 10,808,454 B1 * | 10/2020 | Weix | A47G 5/02 |
| 11,135,989 B2 * | 10/2021 | Reynolds | B60R 21/12 |
| 11,565,615 B2 * | 1/2023 | Tignanelli | B32B 3/266 |
| 11,584,324 B1 * | 2/2023 | Neal | B60R 21/026 |
| 11,679,732 B2 * | 6/2023 | Matijevich | B60R 21/12 296/24.4 |
| 2002/0087045 A1 | 7/2002 | Perez | |
| 2010/0270818 A1 | 10/2010 | Mills | |
| 2012/0217765 A1 * | 8/2012 | Michael | B60N 2/91 296/24.46 |
| 2014/0361585 A1 * | 12/2014 | Henshaw | B60N 3/002 297/217.3 |
| 2016/0115704 A1 | 4/2016 | Burke | |
| 2017/0231848 A1 | 8/2017 | VanBasten | |

(Continued)

FOREIGN PATENT DOCUMENTS

CA 2473400 5/2010

*Primary Examiner* — Jason S Morrow
(74) *Attorney, Agent, or Firm* — Kyle A. Fletcher, Esq.

(57) ABSTRACT

The driver isolation apparatus comprises a first vertical support, a second vertical support, a third vertical support, a first barrier panel, and a second barrier panel. The driver isolation apparatus may isolate a driver of a vehicle from one or more passengers such that exposure of the driver to airborne droplets that may cause disease may be reduced. The first barrier panel may be supported by the first vertical support and the second vertical support and may be positioned between the driver and one or more rear passengers. The second barrier panel may be supported by the first vertical support and the third vertical support and may be positioned between the driver and a front passenger. The first barrier panel and the second barrier panel may be transparent so that the driver's view is not obstructed by the first barrier panel or by the second barrier panel.

20 Claims, 6 Drawing Sheets

(56) References Cited

U.S. PATENT DOCUMENTS

| | | | |
|---|---|---|---|
| 2021/0291912 A1* | 9/2021 | Erlacher | B60R 21/026 |
| 2021/0355752 A1* | 11/2021 | Weix | A47G 5/02 |
| 2021/0380062 A1* | 12/2021 | Matijevich | B60R 21/026 |
| 2022/0105891 A1* | 4/2022 | Nilsson | B60N 2/206 |
| 2022/0212619 A1* | 7/2022 | Porter | B60R 21/026 |
| 2022/0281400 A1* | 9/2022 | Bornais | B60R 21/12 |
| 2023/0054989 A1* | 2/2023 | Rios | B60R 21/026 |

* cited by examiner

DRIVER ISOLATION APPARATUS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of personal protection and medical barriers, more specifically, a driver isolation apparatus.

SUMMARY OF INVENTION

The driver isolation apparatus comprises a first vertical support, a second vertical support, a third vertical support, a first barrier panel, and a second barrier panel. The driver isolation apparatus may isolate a driver of a vehicle from one or more passengers such that exposure of the driver to airborne droplets that may cause disease may be reduced. The first barrier panel may be supported by the first vertical support and the second vertical support and may be positioned between the driver and one or more rear passengers. The second barrier panel may be supported by the first vertical support and the third vertical support and may be positioned between the driver and a front passenger. The first barrier panel and the second barrier panel may be transparent so that the driver's view is not obstructed by the first barrier panel or by the second barrier panel.

An object of the invention is to isolate a driver of a vehicle from one or more passengers such that exposure to airborne droplets that may cause disease may be reduced.

Another object of the invention is to isolate the driver from rear seat passengers using a first barrier panel.

A further object of the invention is to isolate the driver from a front seat passenger using a second barrier panel.

Yet another object of the invention is to provide hinges such that the first barrier panel and the second barrier panel may fold for storage.

These together with additional objects, features and advantages of the driver isolation apparatus will be readily apparent to those of ordinary skill in the art upon reading the following detailed description of the presently preferred, but nonetheless illustrative, embodiments when taken in conjunction with the accompanying drawings.

In this respect, before explaining the current embodiments of the driver isolation apparatus in detail, it is to be understood that the driver isolation apparatus is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the driver isolation apparatus.

It is therefore important that the claims be regarded as including such equivalent construction insofar as they do not depart from the spirit and scope of the driver isolation apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
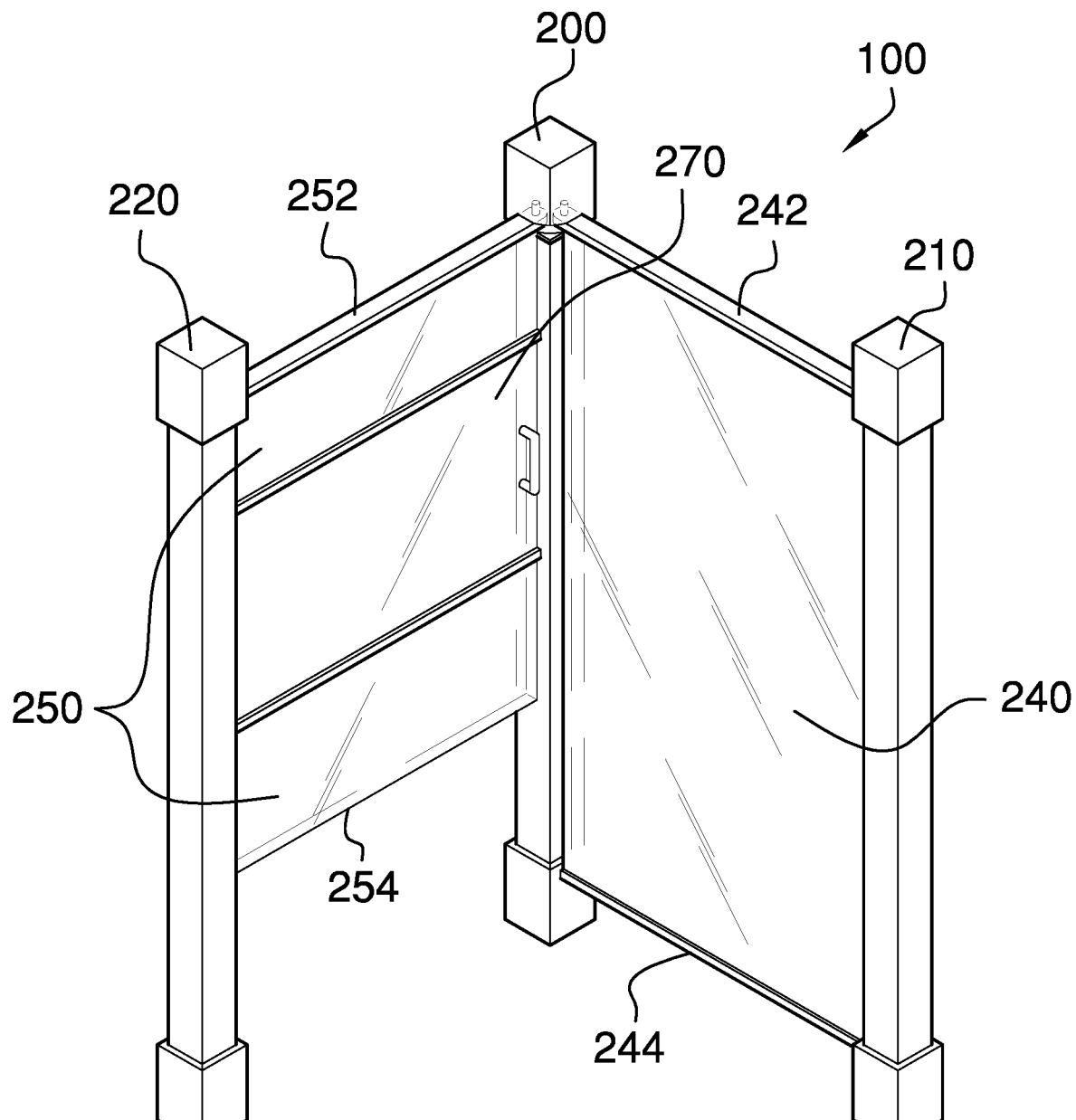
FIG. 1 is an isometric view of an embodiment of the disclosure.
Figure 2:
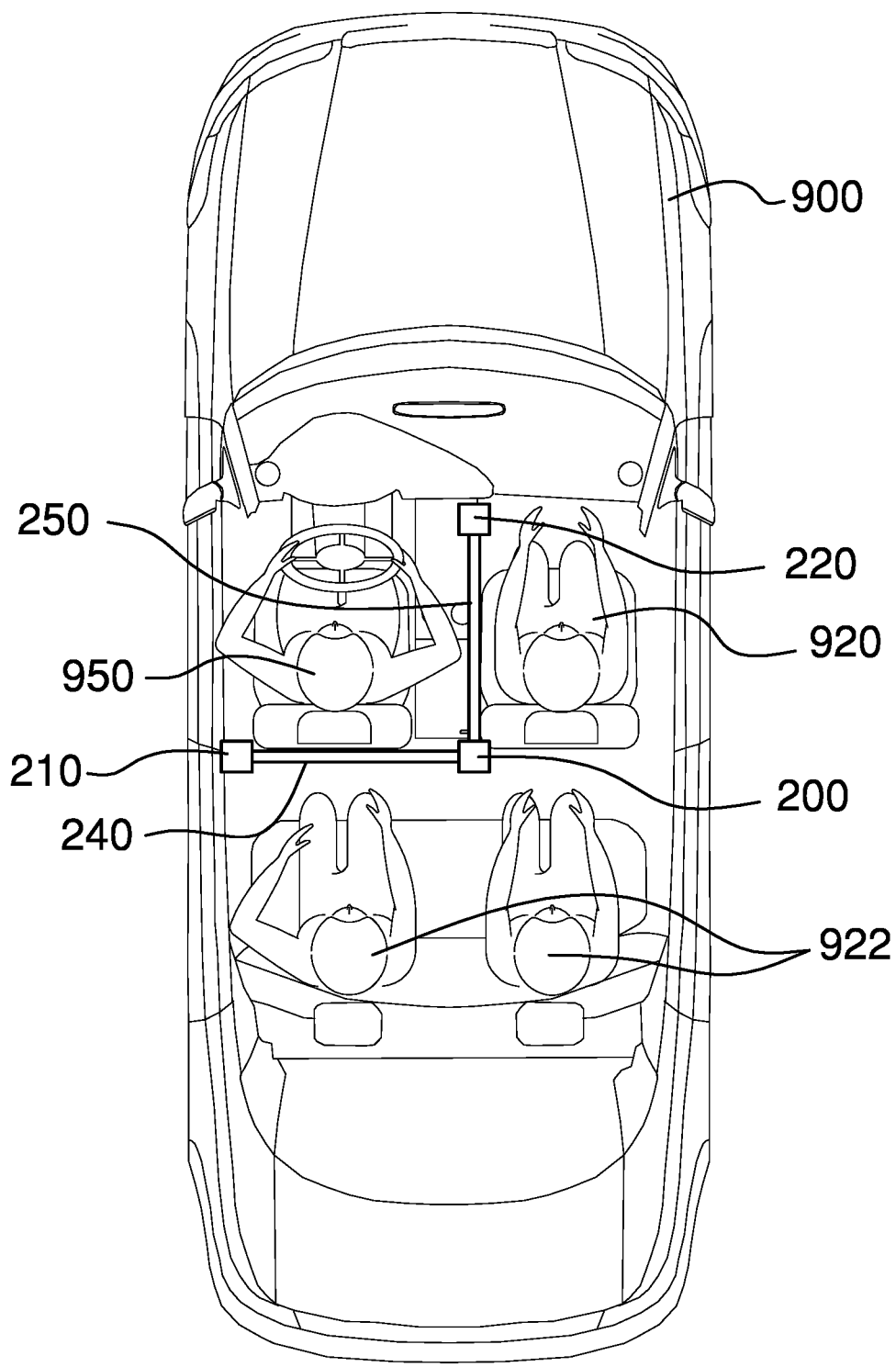
FIG. 2 is an in-user top view of an embodiment of the disclosure.
Figure 3:
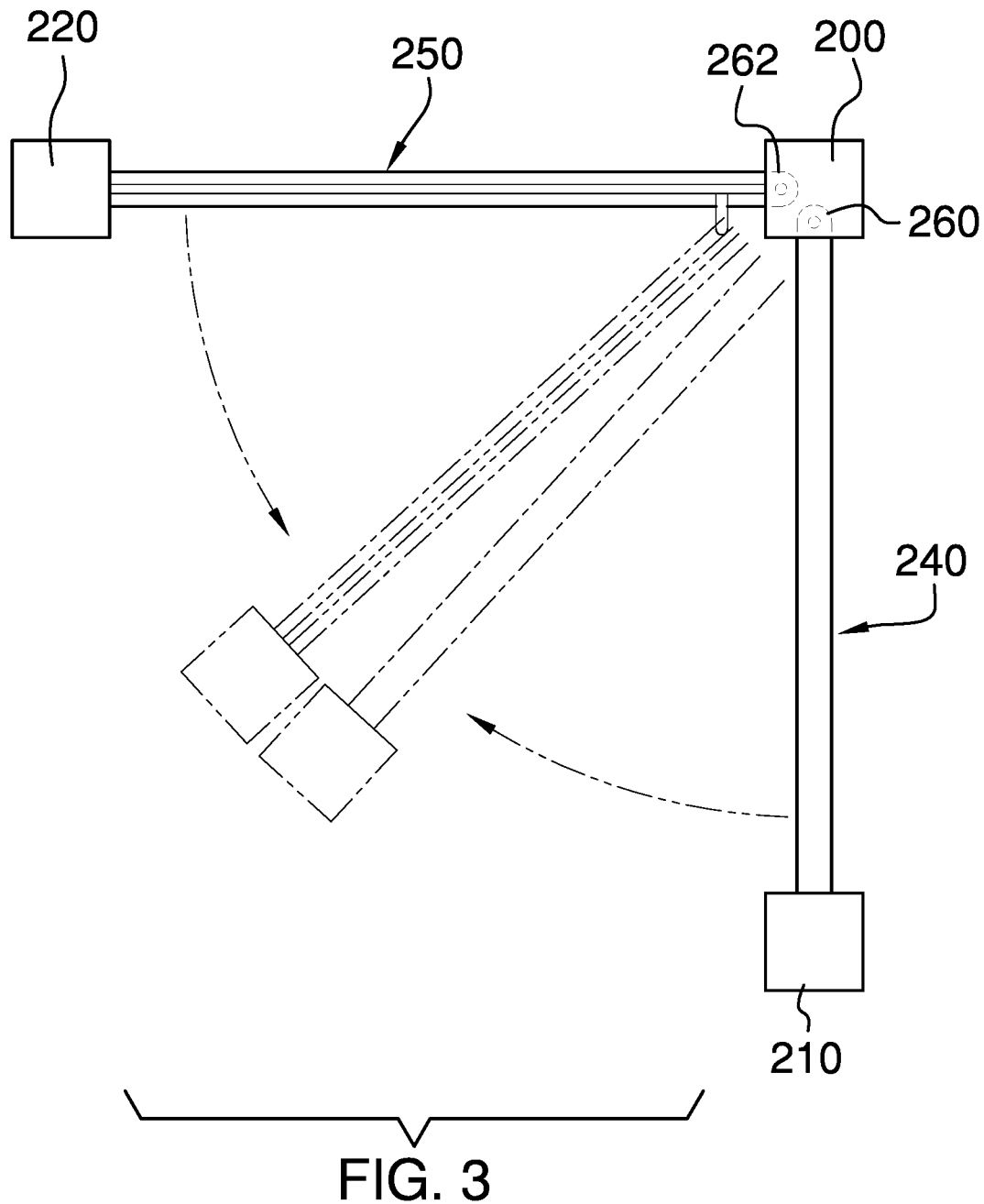
FIG. 3 is a top view of an embodiment of the disclosure.
Figure 4:
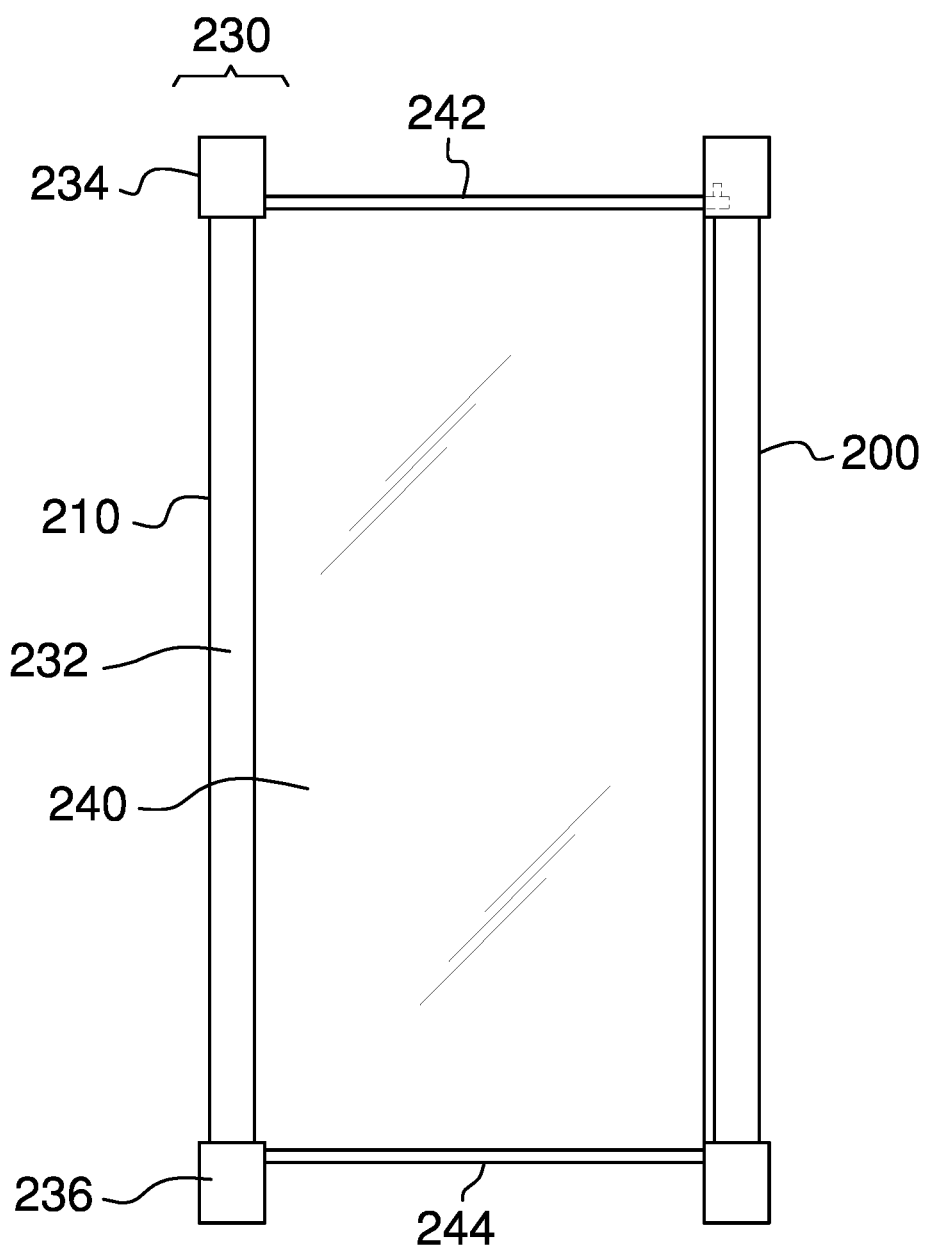
FIG. 4 is a rear view of an embodiment of the disclosure.
Figure 5:
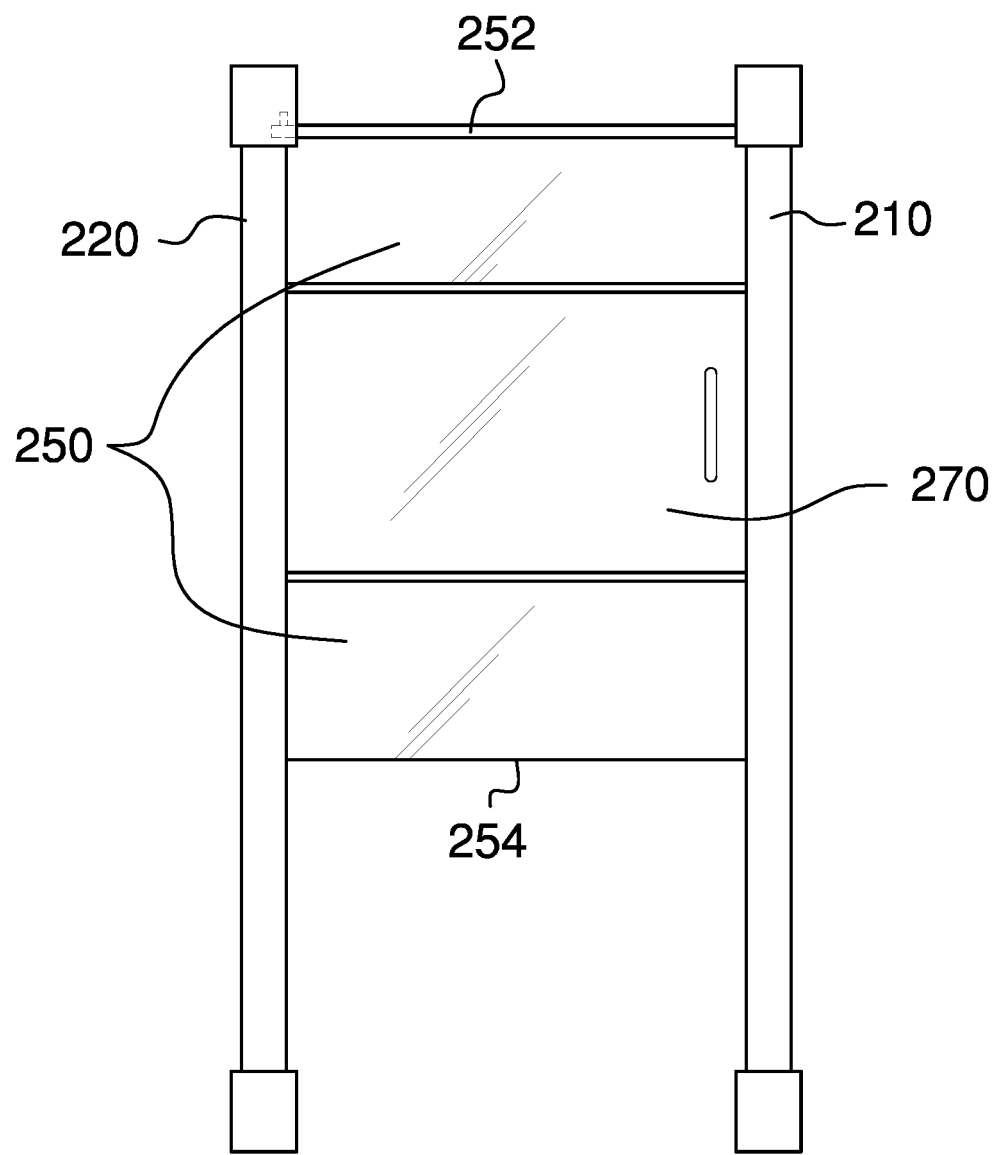
FIG. 5 is a side view of an embodiment of the disclosure.
Figure 6:
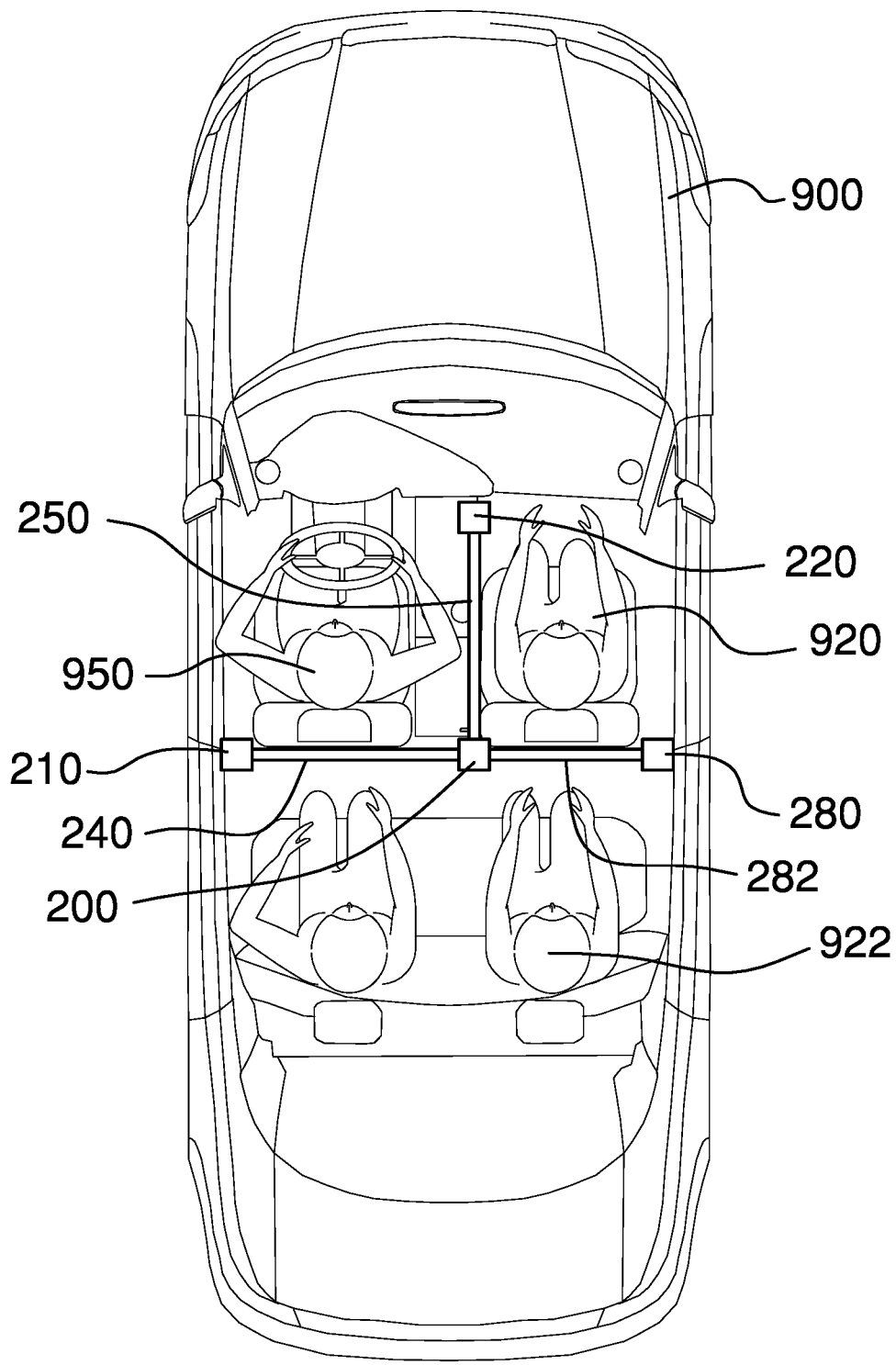
FIG. 6 is an in-use top view of an alternative embodiment of the disclosure illustrating the addition of a third barrier panel.

Detailed reference will now be made to a first potential embodiment of the disclosure, which is illustrated in FIGS. 1 through 6.

The driver isolation apparatus 100 (hereinafter invention) comprises a first vertical support 200, a second vertical support 210, a third vertical support 220, a first barrier panel 240, and a second barrier panel 250. The invention 100 may isolate a driver 950 of a vehicle 900 from one or more passengers such that exposure of the driver 950 to airborne droplets that may cause disease may be reduced. The first barrier panel 240 may be supported by the first vertical support and the second vertical support 210 and may be positioned between the driver 950 and one or more rear passengers 922. The second barrier panel 250 may be supported by the first vertical support 200 and the third vertical support 220 and may be positioned between the driver 950 and a front passenger 920. The first barrier panel 240 and the second barrier panel 250 may be transparent so that the driver's view is not obstructed by the first barrier panel 240 or by the second barrier panel 250. As non-limiting examples, the vehicle 900 may be an automobile or an SUV.

The first vertical support 200 and the second vertical support 210 may be vertically-oriented columns that rest on a floor of the vehicle 900. In some embodiments, the top of the first vertical support 200 and/or the top of the second vertical support 210 may press against a roof of the vehicle 900. The first barrier panel 240 may be coupled to the first vertical support 200 and to the second vertical support 210 such that the first barrier panel 240 is held in a vertical orientation behind the driver 950.

The third vertical support 220 may be a vertically-oriented column. In some embodiments, the third vertical support 220 may rest on the floor of the vehicle 900. In some embodiments, the third vertical support 220 may rest on a center console of the vehicle 900. In some embodiments, the top of the third vertical support 220 may press against the roof of the vehicle 900. The second barrier panel 250 may be coupled to the first vertical support 200 and to the third vertical support 220 such that the first barrier panel 240 is held in a vertical orientation alongside the driver 950.

An individual vertical support 230 selected from the first vertical support 200, the second vertical support 210, and the third vertical support 220 may comprise a support body 232, a bottom end cap 236, and a top end cap 234. The support body 232 may couple to the first barrier panel 240, the second barrier panel 250, or both. The bottom end cap 236 may cover the bottom of the support body 232 and may enhance traction between the individual vertical support 230 and the vehicle 900 to reduce the likelihood of the individual vertical support 230 slipping.

The top end cap 234 may cover the top of the support body 232 and may enhance traction between the individual vertical support and the vehicle 900 to reduce the likelihood of the individual vertical support 230 slipping.

The first barrier panel 240 may be a transparent pane. The first barrier panel 240 may block the passage of the airborne droplets from the one or more rear passengers 922 to the driver without obstructing the driver's view. The first barrier panel 240 may comprise a first panel top brace 242 and a first panel bottom brace 244. The first panel top brace 242 may be a horizontal armature that may support the top of the first barrier panel 240 and may prevent flexing of the first barrier panel 240. The ends of the first panel top brace 242 may be coupled to the first vertical support 200 and to the second vertical support 210. The first panel bottom brace 244 may be a horizontal armature that may support the bottom of the first barrier panel 240 and may prevent flexing of the first barrier panel 240. The ends of the first panel bottom brace 244 may be coupled to the first vertical support 200 and to the second vertical support 210.

The second barrier panel 250 may be a transparent pane. The second barrier panel 250 may block the passage of the airborne droplets from the front passenger 920 to the driver 950 without obstructing the driver's view. The second barrier panel 250 may comprise a second panel top brace 252 and a second panel bottom brace 254. The second panel top brace 252 may be a horizontal armature that may support the top of the second barrier panel and may prevent flexing of the second barrier panel 250. The ends of the second panel top brace 252 may be coupled to the first vertical support 200 and to the third vertical support 220. The second panel bottom brace 254 may be a horizontal armature that may support the bottom of the second barrier panel 250 and may prevent flexing of the second barrier panel 250. The ends of the second panel bottom brace 254 may be coupled to the first vertical support 200 and to the third vertical support 220.

In some embodiments, the first barrier panel 240, the second barrier panel 250, or both may be hingedly coupled to the first vertical support 200 such that the angular distance between the first barrier panel 240 and the second barrier panel 250 may be reduced for storing the invention 100. The first barrier panel 240 may be hingedly coupled to the first vertical support 200 via a first panel hinge set 260. The second barrier panel 250 may be hingedly coupled to the first vertical support 200 via a second panel hinge set 262. In some embodiments, the first barrier panel 240 and the second barrier panel 250 may pivot towards each other until the second vertical support 210 contacts the third vertical support 220.

In some embodiments, the second barrier panel 250 may comprise a window 270. The window 270 may be a movable transparent panel that may be operable to open and close so that payments, documents, and other items may be passed through the second barrier panel 250. As non-limiting examples, the window 270 may open and close by pivoting about a vertically-oriented window hinge, by pivoting about a horizontally-oriented window hinge, by sliding on one or more window tracks, or by raising and lowering on a window sash.

In some embodiments, the invention 100 may comprise a fourth vertical support 280 and a third barrier panel 282. One side of the third barrier panel 282 may couple to the fourth vertical support 280 and the opposing side of the third barrier panel 282 may detachably couple to the first vertical support 200. The third barrier panel 282 may isolate the one or more rear passengers 922 when the third barrier panel 282 is in place. The third barrier panel 282 may be transparent so that the driver's view is not obstructed by the third barrier panel 282.

In use, the invention 100 may be installed within the vehicle 900 with the first barrier panel 240, the first vertical support 200, and the second vertical support 210 located behind the driver 950 and the second barrier panel 250 and the third vertical support 220 to the side of the driver 950. The first barrier panel 240 may be located between the driver 950 and the one or more rear passengers 922 and the first barrier panel 240 may be located between the driver 950 and the front passenger 920. The first barrier panel 240 and the second barrier panel may block the airborne droplets from travelling to the driver 950 from the one or more rear passengers 922 or the front passenger 920. In some embodiments, the invention 100 may be folded for storage. In some embodiments, the window 270 may be opened and closed to pass items to and from the driver 950.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, a "brace" may be a structural element that is used to support or otherwise steady an object.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, "orientation" may refer to the positioning and/or angular alignment of a first object relative to a second object or relative to a reference position or reference direction.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, "transparent" may refer to a material that allows light to pass through the material without significant scattering such that an object can be seen without distortion through the material.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A driver isolation apparatus in combination with a vehicle comprising:
    a first vertical support, a second vertical support, a third vertical support, a first barrier panel, and a second barrier panel;
    wherein the driver isolation apparatus isolates a driver of a vehicle from one or more passengers such that exposure of the driver to airborne droplets is reduced;
    wherein the first barrier panel is supported by the first vertical support and the second vertical support and is positioned between the driver and one or more rear passengers;
    wherein the second barrier panel is supported by the first vertical support and the third vertical support and is positioned between the driver and a front passenger;
    wherein the first barrier panel and the second barrier panel are transparent so that the driver's view is not obstructed by the first barrier panel or by the second barrier panel.

2. The driver isolation apparatus according to claim 1 wherein the first vertical support and the second vertical support are vertically-oriented columns that rest on a floor of the vehicle.

3. The driver isolation apparatus according to claim 2 wherein the top of the first vertical support and/or the top of the second vertical support press against a roof of the vehicle;
    wherein the first barrier panel is coupled to the first vertical support and to the second vertical support such that the first barrier panel is held in a vertical orientation behind the driver.

4. The driver isolation apparatus according to claim 3 wherein the third vertical support is a vertically-oriented column.

5. The driver isolation apparatus according to claim 4 wherein the third vertical support rests on the floor of the vehicle.

6. The driver isolation apparatus according to claim 4 wherein the third vertical support rests on a center console of the vehicle.

7. The driver isolation apparatus according to claim 4 wherein the top of the third vertical support presses against the roof of the vehicle.

8. The driver isolation apparatus according to claim 4 wherein the second barrier panel is coupled to the first vertical support and to the third vertical support such that the first barrier panel is held in a vertical orientation alongside the driver.

9. The driver isolation apparatus according to claim 8 wherein an individual vertical support selected from the first vertical support, the second vertical support, and the third vertical support comprises a support body, a bottom end cap, and a top end cap;
    wherein the support body couples to the first barrier panel, the second barrier panel, or both;
    wherein the bottom end cap covers the bottom of the support body and enhances traction between the individual vertical support and the vehicle;
    wherein the top end cap covers the top of the support body and enhances traction between the individual vertical support and the vehicle.

10. The driver isolation apparatus according to claim 9 wherein the first barrier panel is a transparent pane;
    wherein the first barrier panel blocks the passage of the airborne droplets from the one or more rear passengers to the driver without obstructing the driver's view.

11. The driver isolation apparatus according to claim 10 wherein the first barrier panel comprises a first panel top brace and a first panel bottom brace;
    wherein the first panel top brace is a horizontal armature that supports the top of the first barrier panel and prevents flexing of the first barrier panel;
    wherein the ends of the first panel top brace are coupled to the first vertical support and to the second vertical support;
    wherein the first panel bottom brace is a horizontal armature that supports the bottom of the first barrier panel and prevents flexing of the first barrier panel;
    wherein the ends of the first panel bottom brace are coupled to the first vertical support and to the second vertical support.

12. The driver isolation apparatus according to claim 11 wherein the second barrier panel is a transparent pane;
wherein the second barrier panel blocks the passage of the airborne droplets from the front passenger to the driver without obstructing the driver's view.

13. The driver isolation apparatus according to claim 12 wherein the second barrier panel comprises a second panel top brace and a second panel bottom brace;
wherein the second panel top brace is a horizontal armature that supports the top of the second barrier panel and prevents flexing of the second barrier panel;
wherein the ends of the second panel top brace are coupled to the first vertical support and to the third vertical support.

14. The driver isolation apparatus according to claim 13 wherein the second panel bottom brace is a horizontal armature that supports the bottom of the second barrier panel and prevents flexing of the second barrier panel;
wherein the ends of the second panel bottom brace are coupled to the first vertical support and to the third vertical support.

15. The driver isolation apparatus according to claim 14 wherein the first barrier panel, the second barrier panel, or both are hingedly coupled to the first vertical support such that the angular distance between the first barrier panel and the second barrier panel is reduced for storing the driver isolation apparatus.

16. The driver isolation apparatus according to claim 15 wherein the first barrier panel is hingedly coupled to the first vertical support via a first panel hinge set.

17. The driver isolation apparatus according to claim 16 wherein the second barrier panel is hingedly coupled to the first vertical support via a second panel hinge set.

18. The driver isolation apparatus according to claim 17 wherein the first barrier panel and the second barrier panel pivot towards each other until the second vertical support contacts the third vertical support.

19. The driver isolation apparatus according to claim 18 wherein the second barrier panel comprises a window;
wherein the window is a movable transparent panel that is operable to open and close.

20. The driver isolation apparatus according to claim 19 wherein the driver isolation apparatus comprises a fourth vertical support and a third barrier panel;
wherein one side of the third barrier panel couples to the fourth vertical support and the opposing side of the third barrier panel detachably couples to the first vertical support;
wherein the third barrier panel isolates the one or more rear passengers;
wherein the third barrier panel is transparent so that the driver's view is not obstructed by the third barrier panel.

\* \* \* \* \*